United States Patent [19]

Matsuno et al.

[11] Patent Number: 4,643,154

[45] Date of Patent: Feb. 17, 1987

[54] METHOD OF AND DEVICE FOR CONTROLLING FUEL INJECTION TIMING IN DIESEL ENGINE

[75] Inventors: Kiyotaka Matsuno; Masaomi Nagase, both of Toyota; Keisuke Tsukamoto, Nagoya, all of Japan

[73] Assignee: Toyota Jidosha Kabushiki Kaisha, Toyota, Japan

[21] Appl. No.: 769,467

[22] Filed: Aug. 26, 1985

[30] Foreign Application Priority Data

Aug. 27, 1984 [JP] Japan .................................. 59-177833

[51] Int. Cl.$^4$ ............................................ F02D 41/40
[52] U.S. Cl. ...................................... 123/501; 123/486
[58] Field of Search ............... 123/500, 501, 502, 305, 123/486, 480

[56] References Cited

U.S. PATENT DOCUMENTS

| | | | |
|---|---|---|---|
| 4,355,621 | 10/1982 | Yasuhara | 123/500 |
| 4,368,705 | 1/1983 | Stevenson et al. | 123/501 |
| 4,401,076 | 8/1983 | Sano et al. | 123/500 |

*Primary Examiner*—Andrew M. Dolinar
*Attorney, Agent, or Firm*—Parkhurst & Oliff

[57] ABSTRACT

In determining the maximum injection timing most suitable for the time when the fuel injection reaches the maximum quantity at least as commensurate to an engine speed and an intake air pressure, the basic maximum injection timing most suitable for the time when the fuel injection reaches the maximum quantity under the atmospheric pressure as commensurate to an engine speed, and the basic maximum injection timing is corrected at least by an intake air pressure to provide the maximum injection timing, so that the maximum injection timing can be directly determined from an engine speed and an intake air pressure without determining the basic maximum injection quantity and the maximum injection quantity.

8 Claims, 8 Drawing Figures

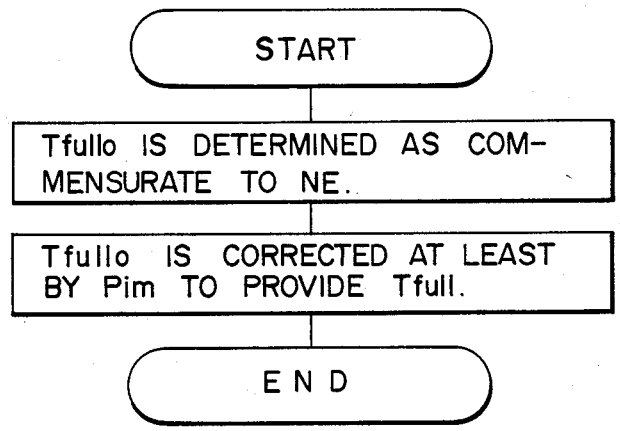
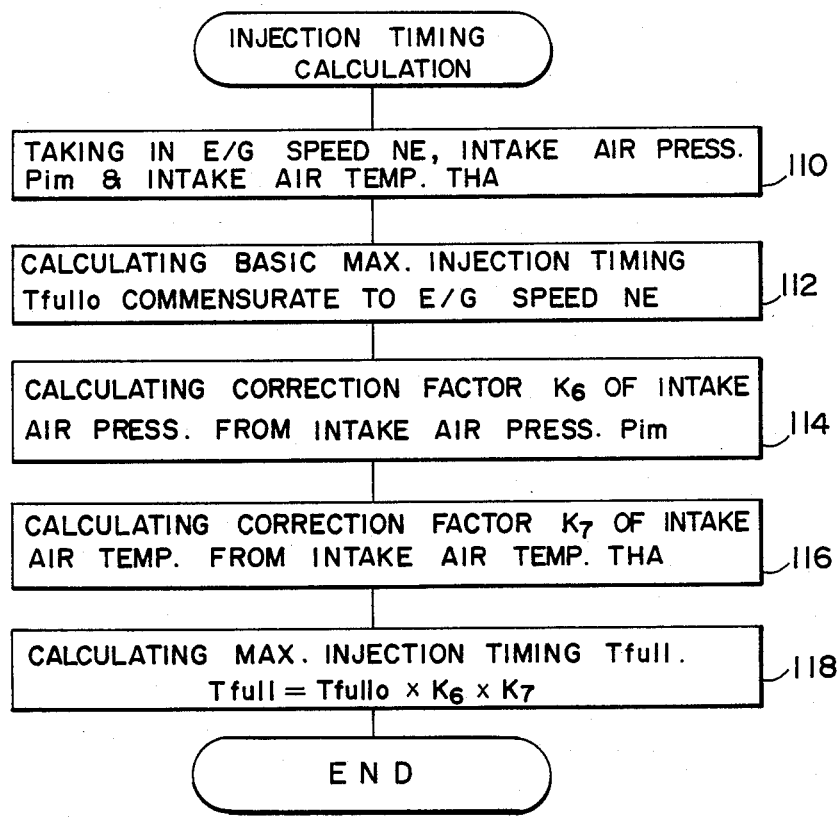

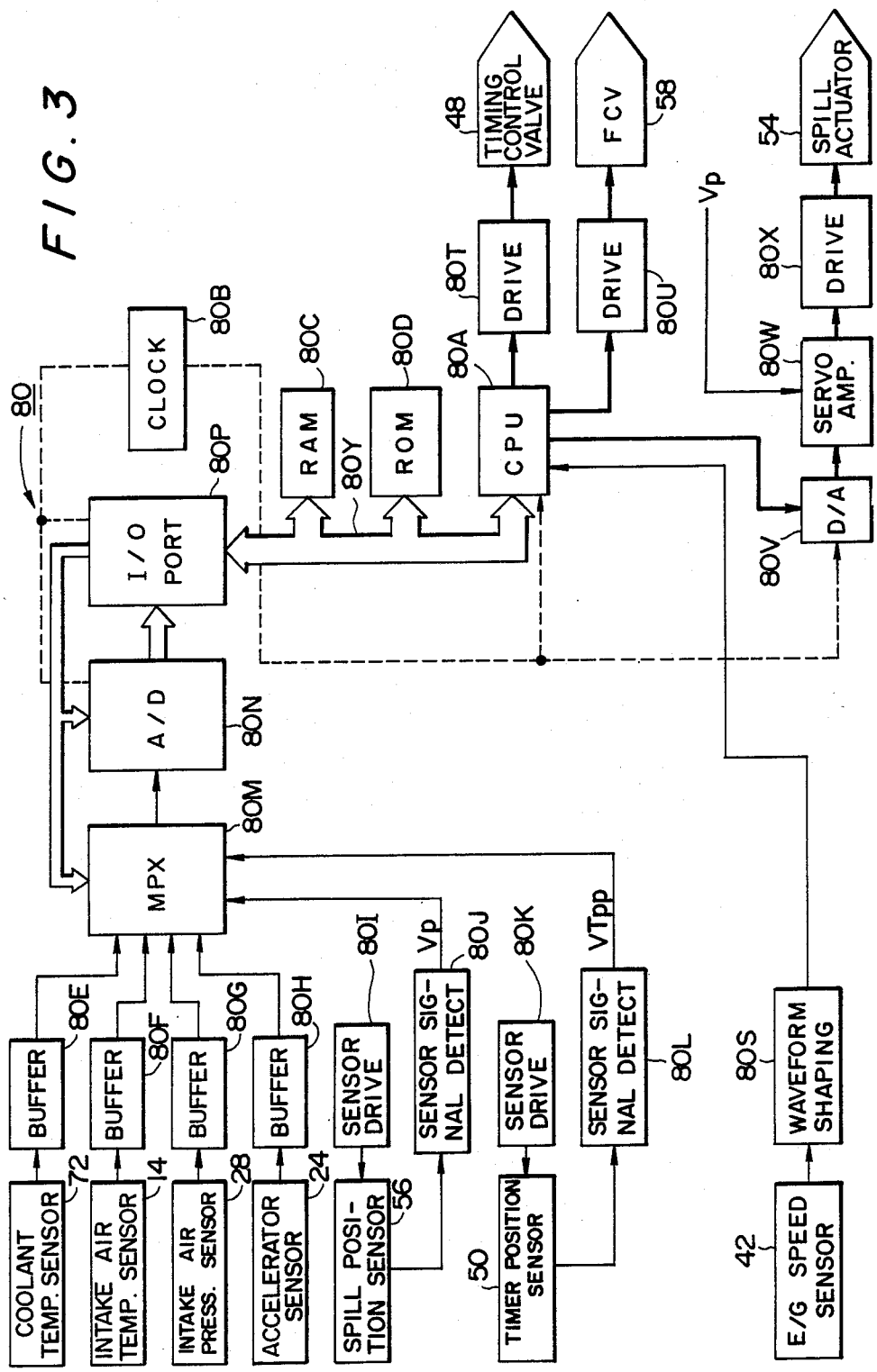

METHOD OF AND DEVICE FOR CONTROLLING FUEL INJECTION TIMING IN DIESEL ENGINE

BACKGROUND OF THE INVENTION

1. Field of the Invention

This invention relates to a method of and a device for controlling a fuel injection timing in a diesel engine, and more particularly to improvements in a method of and a device for controlling a fuel injection timing in a diesel engine, suitable for use in an electronically controlled diesel engine for a motor vehicle, wherein the maximum injection timing most suitable for the time when the fuel injection reaches the maximum quantity is determined as commensurate to at least an engine speed and an intake air pressure and an injection timing is controlled in accordance with the maximum injection timing.

2. Description of the Prior Art

In general, in a diesel engine, the fuel fed to combustion chamber thereof is controlled by a fuel injection pump rotatably driven in synchronism with the rotation of the engine, and a timer is moved by supply pressure of a feed pump provided in the fuel injection pump so as to move a roller ring, whereby the fuel injection timing is controlled. Furthermore, a spill ring is moved by a centrifugal governor to change the ending time of pressure feed, whereby the fuel injection quantity is controlled. However, since the timer and the spill ring have heretofore been mechanically controlled, it has been difficult to precisely conduct the fuel injection control.

On the other hand, along with the development in the techniques of electronic control, particularly, in the techniques of digital control, the attempt at electronically controlling the fuel injection pump as disclosed in Japanese Patent Laid-Open No. 146023/1981 for example is made. The electronic control of the type described makes it possible to inject the optimal quantity of fuel at the optimal injection timing in accordance with the engine operating conditions such as an engine speed, an engine load and the like.

However, heretofore, in calculating the optimal injection timing commensurate to the intake air pressure, firstly, the basic maximum injection quantity Qfullo has been determined in accordance with the engine speed, the maximum injection quantity Qfull has been calculated by multiplying the basic maximum injection quantity Qfullo by a factor commensurate to the intake air pressure, and the maximum injection timing Tfull then capable of controlling the smoke and preventing the increase in the chamber temperature and exhaust-gas temperature has been determined from the maximum injection quantity Qfull and the engine speed NE, whereby, in order to determine the maximum injection timing Tfull, firstly, it has been necessary to determine the maximum injection quantity Qfull, thus presenting the disadvantage of increasing the steps in the precess of determining the maximum injection timing Tfull.

On the other hand, as an invention similar to the present invention, in Japanese Patent Laid-Open No. 150035/1983, the applicant has proposed a method, wherein a basic injection timing is calculated on the basis of an engine speed, a fuel injection quantity and the like and the basic injection timing is corrected as commensurate to a variation in intake air pressure from a reference intake air pressure. However, this method is not a method of determining the maximum injection timing and has as its object the altitude compensation of the basic injection timing. So, the method has been different in object from the present invention, and moreover, has required to determine the fuel injection quantity in calculating the basic injection timing.

SUMMARY OF THE INVENTION

The present invention has been developed to obviate the above-described disadvantages of the prior art and has as its object the provision of a method of and a device for controlling a fuel injection timing of a diesel engine, capable of directly determining the maximum injection timing from an engine speed and an intake air pressure, but without determining the basic maximum injection quantity and the maximum injection quantity.

To this end, the present invention contemplates that, in a method of controlling a fuel injection timing of a diesel engine, wherein the maximum injection timing most suitable for the time when the fuel injection reaches the maximum quantity is determined as commensurate to at least an engine speed and an intake air pressure and an injection timing is controlled in accordance with the maximum injection timing, as the gist thereof is shown in FIG. 1, the method comprises:

a step of determining the basic maximum injection timing most suitable for the time when the fuel injection reaches the maximum quantity under the atmospheric pressure as commensurate to an engine speed; and a step of correcting the basic maximum injection timing at least by an intake air pressure to provide the maximum injection timing.

A specific form of the present invention is of such an arrangement that the basic maximum injection timing is corrected by an intake air pressure and an intake air temperature to provide the maximum injection timing, so that the more proper maximum injection timing can be determined.

To the above end, the present invention contemplates that, in a device for controlling a fuel injection timing in a diesel engine, the device comprises:

means for detecting an engine speed;

means for detecting an intake air pressure;

means for detecting an intake air temperature;

means for respectively storing a one-dimensional map indicating the relationship between an engine speed and the basic maximum injection timing most suitable for the time when the fuel injection reaches the maximum quantity under the atmospheric pressure, another one-dimensional map indicating the relationship between an intake air pressure and a correction factor of intake air pressure and a further one-demensional map indicating the relationship between an intake air temperature and a correction factor of intake air temperature;

means for calculating by interpolation the basic maximum injection timing by use of the one-dimensional map as commensurate to the detected engine speed;

means for calculating by interpolation the correction factor of intake air pressure by use of the one-dimensional map as commensurate to the detected intake air pressure;

means for calculating by interpolation the correction factor of intake air temperature by use of the one-dimensional map as commensurate to a detected intake air temperature;

multiplying means for correcting the calculated basic maximum injection timing by multiplying the same by the correction factor of intake air pressure and the correction factor of intake air temperature and for determining the maximum injection timing most suitable for the time when the fuel injection reaches the maximum quantity; and means for controlling an injection timing as commensurate to the determined maximum injection timing.

According to the present invention, in determining the maximum injection timing most suitable for the time when the fuel injection reaches the maximum quantity at least as commensurate to an engine speed and an intake air pressure, the basic maximum injection timing most suitable for the time when the fuel injection reaches the maximum quantity under the atmospheric pressure is determined as commensurate to an engine speed, and the basic maximum injection timing is corrected at least by an intake air pressure to provide the maximum injection timing, so that the maximum injection timing can be directly determined from an engine speed and an intake air pressure without determining the basic maximum injection quantity and the maximum injection quantity. In consequence, the number of steps and the number of words for determining the basic maximum injection timing in a program can be reduced.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 1 is a flow chart showing the gist of the method of controlling a fuel injection timing of a diesel engine according to the present invention;

FIG. 3 is a block diagram showing the arrangement of the electronic control unit used in the above embodiment;

FIG. 4 is a flow chart showing the essential portions of a routine of calculating the fuel injection timing used in the above embodiment;

DETAILED DESCRIPTION OF THE INVENTION

Detailed description will hereunder be given of one embodiment of the fuel injection control device of the electronically controlled diesel engine for a motor vehicle, to which is applied the method of controlling the fuel injection timing of a diesel engine according to the present invention.

Figure 2:
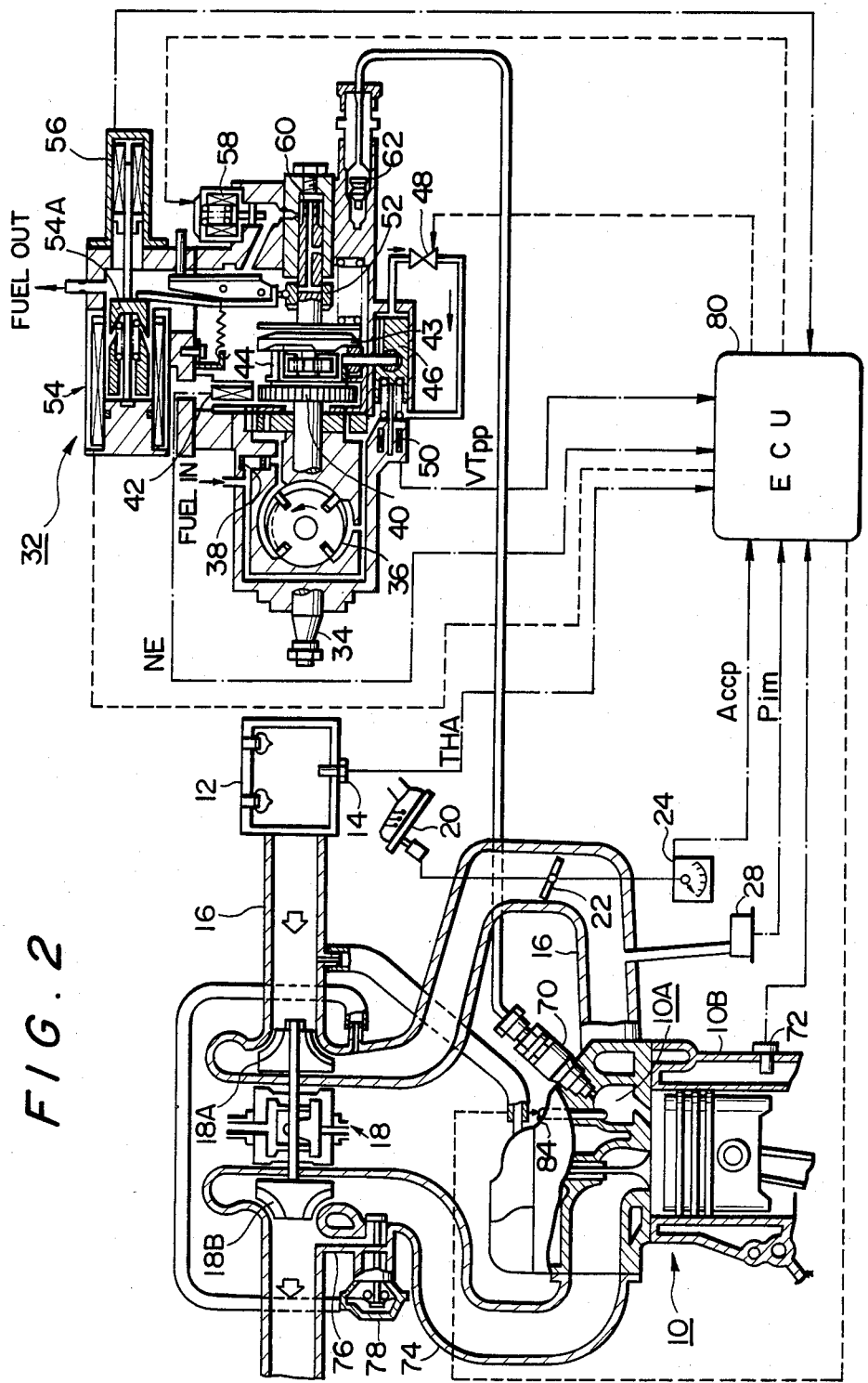
FIG. 2 is a sectional view with a partial block diagram showing the arrangement of one embodiment of the fuel injection control device in the electronically controlled diesel engine for a motor vehicle, to which the present invention is applied.

As shown in FIG. 2, this embodiment comprises:

an intake air temperature sensor 14 provided on an air cleaner 12, for detecting a temperature of intake air;

a turbocharger 18 provided on the intermediate portion of an air intake pipe 16 and having a compressor 18A for compressing intake air by the utilization of exhaust-gas energy;

an intake air throttle valve 22 adapted to rotate in operational association with an accelerator pedal 20 provided in a driver's seat, for restricting a flowrate of intake air compressed by the compressor 18A of the turbocharger 18;

an accelerator sensor 24 for detecting an opening Accp of the accelerator pedal 20;

an intake air pressure sensor 28 for detecting pressure of intake air in the intake air pipe 16 at the downstream of the intake air throttle valve 22;

a fuel injection pump 32 including a drive shaft 34 rotatable in operational association with the rotation of a crankshaft of a diesel engine 10, a feed pump 36 (FIG. 2 shows the state where the feed pump is unfolded through 90°) solidly secured to the drive shaft 34, for feeding fuel under pressure, a fuel pressure regulating valve 38 for regulating fuel supply pressure, an engine speed sensor 42 formed of an electromagnetic pickup for example, for detecting an engine speed NE of the diesel engine 10 from a rotational displacement of a gear 40 solidly secured to the drive shaft 34, a roller ring 44 driving a pump plunger 60 in cooperation with a face cam 43, a timer poston 46 (FIG. 2 shows the state where the timer piston is unfolded through 90°) for controlling a turning position of the roller ring 44, a timing control valve 48 for controlling a position of the timer pistion 46 to control the fuel injection timing, a timer position sensor 50 formed of a variable inductance sensor for example, for detecting a position of the timer piston 46, a spill ring 52 for controlling the fuel spill timing of the spill from the pump plunger 60, a spill actuator 54 for controlling the position of the spill ring 52 to control the fuel injection quantity, a spill position sensor 56 formed of a variable inductance sensor for example, for detecting a postion of the spill ring 52 from a displacement of the plunger 54A of the spill actuator 54, a fuel cut solenoid valve (hereinafter referred to as an "FCV") 58 for cutting off the fuel when the engine is stopped in operation, and delivery valves 62 for preventing the backflow and the after-dripping of fuel;

injection nozzles 70 for injecting the fuel discharged from the delivery valves 62 of the fuel injection pump 32 into combustion chambers 10a of the diesel engine 10;

a coolant temperature sensor 72 provided on a cylinder block 10B of the diesel engine 10, for detecting engine coolant temperature;

a turbine 18B of the turbocharger 18 provided in the intermediate portion of an exhaust pipe 74, for rotating the compressor 18A by the utilization of the thermal energy of the exhaust-gas;

an exhaust-gas bypass passage 76 for bypassing the turbine 18B;

an exhaust-gas bypass valve 78 for opening the exhaust-gas bypass 76, when the intake air pressure on the output side of the compressor 18A of the turbocharger 18 exceeds a predetermined value, to prevent an excessive supercharging; and an electronic control unit (hereinafter referred to as an "ECU") 80 wherein the optimal injection timing and the optimal injection quantity are determined from an accelerator opening Accp detected from an output of the accelerator sensor 24, an engine speed NE detected from an output of the engine speed sensor 42, an engine coolant temperature detected from an output of the coolant temperature sensor 72 and so on, and the timing control valve 48, the spill actuator 54 and the like are controlled so that the fuel of the optimal injection quantity can be injected at the optimal injection timing from the fuel injection pump 32.

Referring to the drawing, designated at 84 are glow plugs.

As detailedly shown in FIG. 3, the ECU 80 comprises:

a central processing unit (hereinafter referred to as a "CPU") 80A formed of a microprocessor for example, for conducting various calculations and processings;

a clock circuit 80B for producing various clock signals;

a random access memory (hereinafter referred to as a "RAM") 80C for temporarily storing calculation data and the like in the CPU 80A;

a read only memory (hereinafter referred to as a "ROM") 80D for storing a control program, various data and the like;

a multiplexer (hereinafter referred to as an "MPX) 80M for successively taking an output from the coolant temperature sensor 72, inputted through a buffer 80E, an output from the intake air temperature sensor 14, inputted through a buffer 80F, an output from the intake air pressure sensor 28, inputted through a buffer 80G, an output from the accelerator sensor 24, inputted through a buffer 80H, an output Vp from the spill position sensor 56 driven by a sensor driving frequency signal outputted from a sensor driving circuit 80I, inputted through a sensor signal detecting circuit 80J, an output VTpp from the timer position sensor 50 driven by a sensor driving frequency signal outputted from a sensor driving circuit 80K, inputted through a sensor signal detecting circuit 80L, and so on;

an analogue-digital converter (hereinafter referred to as an "A/D converter") 80N for converting an analogue signal outputted from the MPX 80M into a digital signal;

an input-output port (hereinafter referred to as an "I/O port") 80P for taking an output from the A/D converter 80N into the CPU 80A;

a waveform shaping circuit 80S for waveform shaping an output from the engine speed sensor 42 and directly taking the same into the CPU 80A;

a driving circuit 80T for driving the timing control valve 48 in accordance with the result of calculation in the CPU 80A;

a driving circuit 80U for driving the FCV 58 in accordance with the result of calculation in the CPU 80A;

a servo-amplifier 80W and a driving circuit 80X for driving the spill actuator 54 as commensurate to a deviation between an output from the CPU 80A, which has been converted into an analogue signal by a digital-analogue converter (hereinafter referred to as a "D/A converter") 80V and the output Vp from the spill position sensor 56; and a common bus 80Y for connecting the above-described components to one another.

Description will hereunder be given of action of this embodiment.

Figure 5:
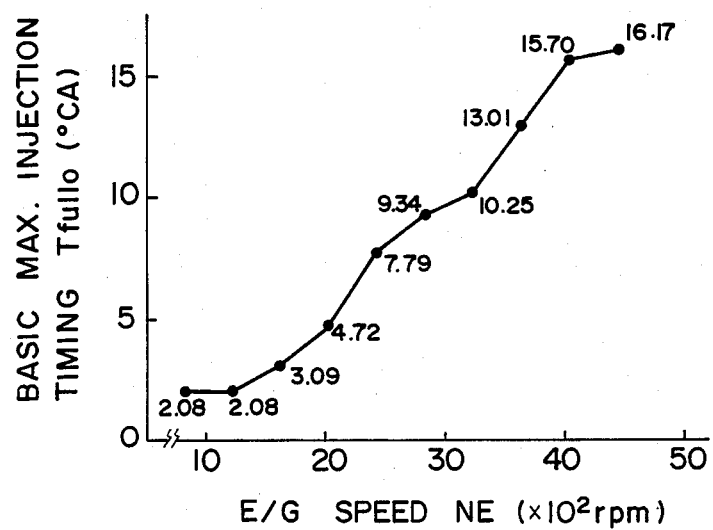
FIG. 5 is a chart showing an example of the relationship between an engine speed and the basic maximum injection timing as used in the above routine.
Figure 6:
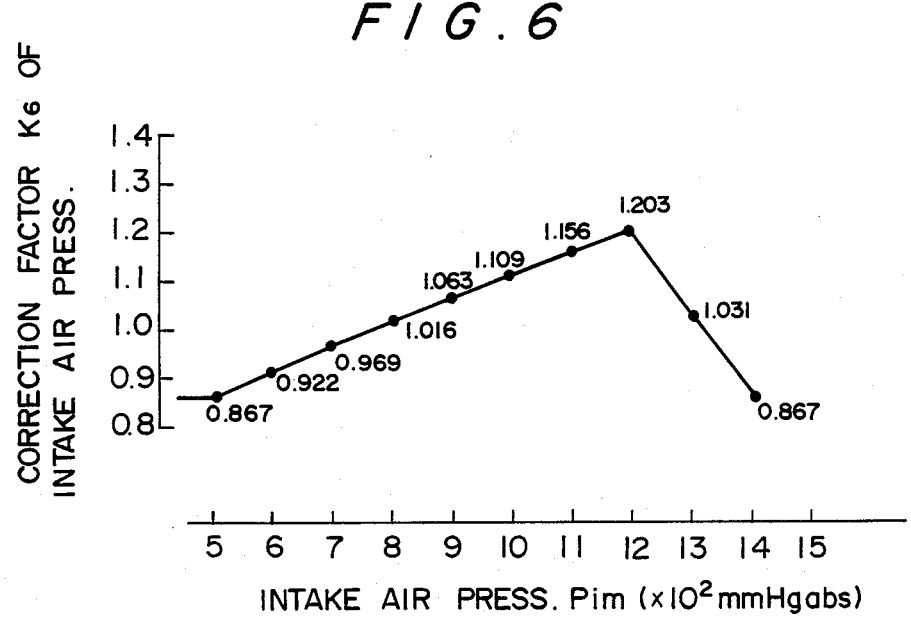
FIG. 6 is a chart showing an example of the relationship between the intake air pressure and the correction factor of intake air pressure as used in the above routine.
Figure 7:
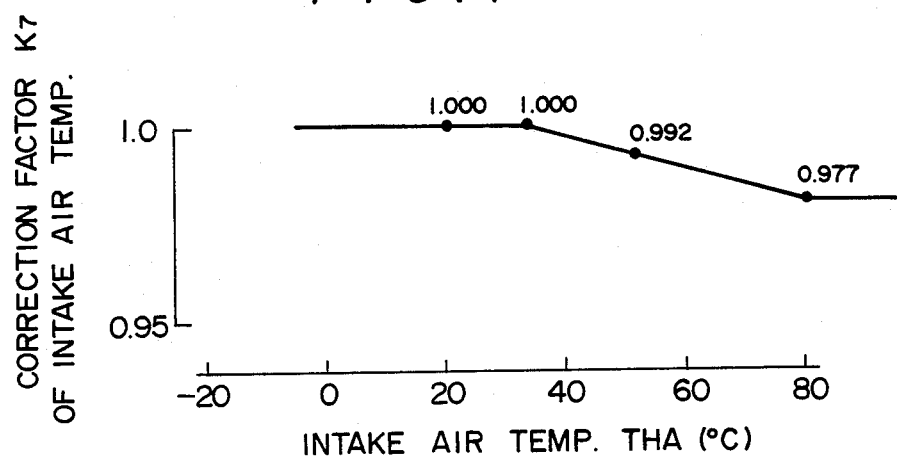
FIG. 7 is a chart showing an example of the relationship between an intake air temperature and the correction factor of intake air temperature as used in the above routine.

Calculation of the maximum injection timing Tfull in this embodiment is carried out in accordance with the flow chart shown in FIG. 4. More specifically, firstly, in Step 110, there are taken in an engine speed NE obtained from an output from the engine speed sensor 42, an intake air pressure Pim obtained from an output from the intake air pressure sensor 28 and an intake air temperature THA obtained from an output of the intake air temperature sensor 14. Subsequently, the routine proceeds to Step 112, where the basic maximum injection timing Tfullo most suitable for the maximum injection quantity when the intake air pressure is 760 mm Hg, i.e. under the atmospheric pressure commensurate to the engine speed NE then is calculated by interpolation by use of the one-dimensional map indicating the relationship between an engine speed NE (rpm) and the basic maximum injection timing Tfullo (°CA), previously stored in the ROM 80D as shown in FIG. 5 for example. Subsequently, the routine proceeds to Step 114, where a correction factor K6 of intake air pressure commensurate to the intake air pressure Pim is calculated by interpolation by use of the one-dimensional map indicating the relationship between the intake air pressure Pim and the correction factor K6, previously stored in the ROM 80D as shown in FIG. 6 for example. Subsequently, the routine proceeds to Step 116, where a correction factor K7 of intake air temperature commensurate to an intake air temperature THA is calculated by interpolation by use of the one-dimensional map indicating the relationship between the intake air temperature THA and the correction factor K7 of intake air temperature, previously stored in the ROM 80D as shown in FIG. 7 for example.

Subsequently, the routine proceeds to Step 118, where, by use of the following equation, the basic maximum injection timing Tfullo is multiplied by the correction factor K6 of intake air pressure and the correction factor K7 of intake air temperature, so as to calculate the maximum injection timing Tfull, thus completing this routine.

$$Tfull = Tfullo \times K6 \times K7 \quad (1)$$

Figure 8:
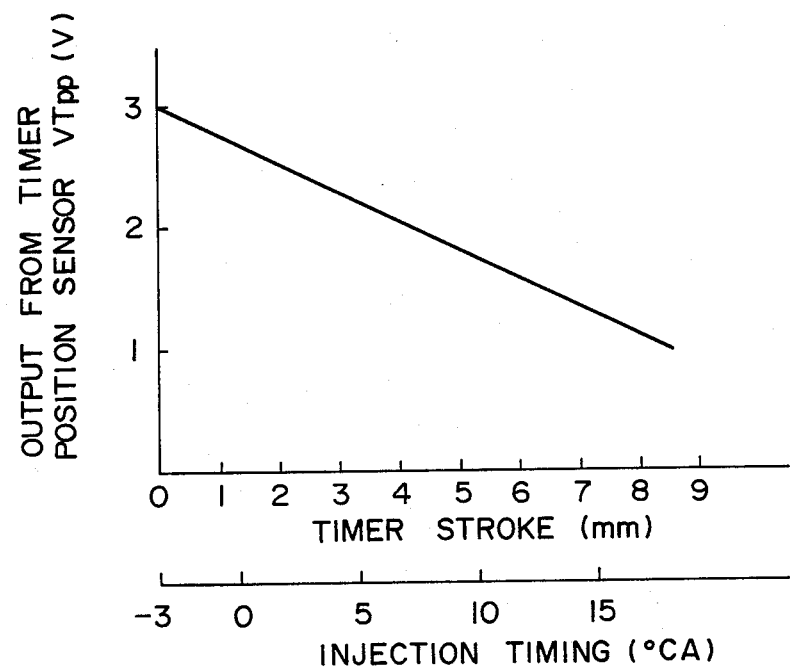
FIG. 8 is a chart showing an example of the relationship between a timer stroke or an injection timing and an output from a timer position sensor used in the above embodiment.

Additionally, in practice, the output VTpp of the timer position sensor 50 becomes a voltage signal as shown in FIG. 8, i.e. the maximum value is 3 Volts, the larger the timer stroke (mm), i.e. the injection timing (°CA) is, the smaller the output VTpp becomes. In consequence, in Step 112, there can be calculated a voltage signal VTfullo (Volt) of the basic maximum injection timing having the relationship in the following equation with the basic maximum injection timing Tfullo (°CA) which can be determined as commensurate with the engine speed NE (rpm) from the relationship shown in FIG. 5.

$$VTfullo = (Tfullo + 2.375)/10.37 \quad (2)$$

Furthermore, in the aforesaid Step 118, the maximum injection timing voltage signal VTfull (Volt) can be calculated by use of the following equation.

$$VTfull = 3.000 - VTfullo \times K6 \times K7 \quad (3)$$

Further, the determination of the final injection timing voltage signal VTfin (Volt) as commensurate to the calculated maximum injection timing voltage signal VTfull (Volt) can be made by use of the following equation.

$$VTfin = Min\ Max[VTbase - VTa - VTacr,$$
$$VTfull - VTarc + VTthw],\ VTw - VTsta \quad (4)$$

where VTbase is a voltage signal (Volt) of a basic injection timing, VTa is a voltage signal (Volt) of an intake air pressure correction lead angle, VTacr is a voltage signal (Volt) of a cold acceleration lead angle, VTthw is a voltage signal (Volt) of an overheat delay angle, VTw is a voltage signal (Volt) of a coolant temperature correction lead angle and VTsta is a voltage signal (Volt) of a starting time correction lead angle.

Additionally, the voltage signal VTfin (Volt) of the final injection timing can be converted into an actual final injection timing Tfin (°CA) by use of the following equation.

$$Tfin = (3 - VTfin) \times 10.37 - 2.375 \qquad (5)$$

As described above, the basic maximum injection timing Tfullo commensurate to the engine speed NE is multiplied by the correction factor K6 of intake air pressure and the correction factor K7 of the intake air temperature, so that the maximum injection timing Tfull most suitable for the engine speed, the intake air pressure and the intake air temperature can be directily calculated without determining the basic maximum injection quantity and the maximum injection quantity.

In this embodiment, not only the correction of the intake air pressure is make by the correction factor K6 of intake air pressure but also the correction of the intake air temperature is made by the correction factor K7 of intake air temperature, so that the more proper maximum injection timing Tfull can be determined. Further, as the case may be, the correction of the intake air temperature by the correction factor K7 of intake air temperature may be omitted.

In the above embodiment, the present invention has been applied to the electronically controlled diesel engine provided thereon with the spill ring as the fuel injection control actuator, however, the scope of application of the present invention need not necessarily limited to this, and the present invention is similarly applicable to the diesel engine provided thereon with the fuel injection quantity control actuator of any other type.

What is claimed is:

1. A method of controlling a fuel injection timing of a diesel engine, wherein the maximum injection timing most suitable for the time when the fuel injection reaches the maximum quantity is determined as commensurate to at least an engine speed and an intake air pressure, and an injection timing is controlled in accordance with the maximum injection timing, characterized in that said method comprises:
   a step of determining the basic maximum injection timing most suitable for the time when the fuel injection reaches the maximum quantity under the atmospheric pressure as commensurate to an engine speed; and
   a step of correcting the basic maximum injection timing at least by an intake air pressure to provide the maximum injection timing.

2. A method of controlling as set forth in claim 1, wherein said basic maximum injection timing is calculated by interpolation by use of a one-dinemsional map indicating the relationship between the engine speed and the basic maximum injection timing.

3. A method of controlling as set forth in claim 1, wherein said basic maximum injection timing is corrected by multiplying said basic maximum injection timing by a correction factor of intake air pressure commensurate to an intake air pressure.

4. A method of controlling as set forth in claim 3, wherein said correction factor of intake air pressure is calculated by interpolation by use of a one-dimensional map indicating the relationship between the intake air pressure and the correction factor of intake air pressure.

5. A method of controlling as set forth in claim 1, wherein said basic maximum injection timing is corrected by the intake air pressure and the intake air temperature to provide the maximum injection timing.

6. A method of controlling as set forth in claim 5, wherein said basic maximum injection timing is corrected by multiplying said basic maximum injection timing by a correction factor of intake air pressure commensurate to an intake air pressure and the correction factor of intake air temperature commensurate to an intake air temperature.

7. A method of controlling as set forth in claim 6, wherein said correction factor of intake air temperature is calculated by interpolation by use of a one-dimensional map indicating the relationship between an intake air temperature and a correction factor of intake air temperature.

8. A device for controlling a fuel injection timing of a diesel engine comprising:
   means for detecting an engine speed;
   means for detecting an intake air pressure;
   means for detecting an intake air temperature;
   means for respectively storing a one-dimensional map indicating the relationship between an engine speed and the basic maximum injection timing most suitable for the time when the fuel injection reaches the maximum quantity under the atmospheric pressure, another one-dimensional map indicating the relationship between an intake air pressure and a correction factor of intake air pressure and a further one-dimensional map indicating the relationship indicating the relationship between an intake air temperature and a correction factor of intake air temperature;
   means for calculating by interpolation the basic maximum injection timing by use of the one-dimensional map as commensurate to the detected engine speed;
   means for calculating by interpolation the correction factor of intake air pressure by use of the one-dimensional map as commensurate to the detected intake air pressure;
   means for calculating by interpolation the correction factor of intake air temperature by use of the one-dimensional map as commensurate to a detected intake air temperature;
   multiplying means for correcting the calculated basic maximum injection timing by multiplying same by the correction factor of intake air pressure and the correction factor of intake air temperature and for determining the maximum injection timing most suitable for the time when the fuel injection reaches the maximum quantity; and means for controlling an injection timing as commensurate to the determined maximum injection timing.

* * * * *